United States Patent
Buch et al.

(10) Patent No.: US 6,434,664 B1
(45) Date of Patent: Aug. 13, 2002

(54) DATA TRANSFER SCHEME FOR EFFICIENTLY MOVING DATA THROUGH A HIGH LATENCY MEDIA ACCESS CHANNEL

(75) Inventors: Bruce Buch, Westboro; Nick Horgan, Marlboro, both of MA (US); Justin J. Koller, Glendale, CO (US); Diana Langer, Northborough; Timothy Proch, Shrewsbury, both of MA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/244,723

(22) Filed: Feb. 4, 1999

(51) Int. Cl.[7] ............................................... G06F 12/00
(52) U.S. Cl. ....................................... 711/112; 711/169
(58) Field of Search .................................. 711/169, 112

(56) References Cited

U.S. PATENT DOCUMENTS 5,784,390 A * 7/1998 Masiewicz .................. 711/169

* cited by examiner

Primary Examiner—Matthew Kim
Assistant Examiner—C. P. Chace
(74) Attorney, Agent, or Firm—Pillsbury Winthrop LLP

(57) ABSTRACT

A non-volatile storage subsystem comprises a media I/O controller, a media access channel, and movable storage media. A non-volatile disk storage subsystem bas a read channel coupling a disk controller to a disk head assembly. A read channel interfacing subsystem is provided as part of the storage subsystem, and the read channel interfacing subsystem interfaces a disk controller to the read channel. The read channel interfacing subsystem comprises a set of process units and a pipeline manager.

7 Claims, 14 Drawing Sheets

DATA TRANSFER SCHEME FOR EFFICIENTLY MOVING DATA THROUGH A HIGH LATENCY MEDIA ACCESS CHANNEL

BACKGROUND OF THE INVENTION

1. Reservation of Copyright

This patent document contains material subject to copyright protection. The copyright owner has no objection to the facsimile reproduction by anyone of the patent document, as it appears in the U.S. Patent and Trademark Office patent files or records, but otherwise reserves all copyright rights whatsoever.

2. Field of the Invention

The present invention is related to processes for moving data through a disk media access channel and systems and methods for managing such processes.

3. Description of Background Information

Hard disk drives, tape drives, and other movable storage media devices transfer data between an I/O controller and movable storage media through a media access channel (also known as a read channel). The media access channel is the route over which information is transferred for read, write, and compare operations, and couples an I/O controller to the media. The media access channel may comprise, among various elements, a plural pin serial or parallel interface coupling the I/O controller to an actuator driver, a read/write head, and, for media read operations, a signal converter for converting an analog signal to a sequence of bits representative of data on the media. In the case of a Partial Response Maximum Likelihood (PRML) disk drive read channel, the disk drive comprises digital signal processing components and components for performing maximum likelihood detection, to facilitate the fast and accurate transfer of data between the disk I/O controller and the disk media.

Media access channels, such as the PRML read channel, are provided with sophisticated filtering and other digital signal processing mechanisms for improving disk performance, by improving such disk characteristics as areal density (disk capacity), data transfer speed, yield, and disk noise. Such improvements are being achieved by PRML read channels without inter-symbol interference (ISI), which results from the overlapping of analog signal peaks being transferred through the read/write head at very large speeds. Rather than merely detecting signal peaks from the media, PRML read channels detect the analog signal from the read/write head, convert the signal to a digital signal, and use the digital signal to detect data bits.

Because disk drives are moving to the use of PRML read channels, aimed at increasing the capacity of the disk drive without sacrificing performance, the latency of data transferred between the media and the I/O controller has increased substantially. As media access channels increase in their latency, it becomes more difficult for the I/O controller to manage transfers over the media access channel. The controller may need to fetch from the disk certain data required to perform various processes associated with a particular operation. Due to the latency of the media access channel, before the fetch process receives the requested information, a large quantity of other data, for example, 20 bytes or more, will be moved through the access channel. Accordingly, the information to be fetched is requested early, and information required for a next process that needs information for the fetch process will be requested immediately thereafter. In this way, when the fetched data is obtained, the data associated with the next process will be provided to the controller shortly thereafter. These media access operations must be requested ahead of time keeping in mind their position within the pipeline and the time at which they will be carried out. If the media access operations are not properly carried out taking these factors into account, problems can be encountered such as destroying adjacent blocks of information, misreading information from the media, or failing to read requested information from the media. In addition, a dependent process, if not provided with timely information from a process upon which it depends, could experience an error.

Accordingly, there is a need for mechanisms for structuring data transfer processes involving the disk media access channel so the controller can accurately handle timing issues and efficiently perform read, write, and compare operations in a pipeline fashion while minimizing access delays, data transfer delays, and errors associated with such operations. There is a need for a scheme which allows for the accumulation of status information regarding the processes used to carry out such operations.

4. Definitions of Terms

The following term definitions are provided to assist in conveying to the reader an understanding of the descriptions provided in this patent document.

Pipe: A portion of memory which is coupled to the output of one process as well as to the input of another process, and allows the process to pass information along to the other process.

Pipeline: A structure comprising multiple sequential stages through which a computation flows as time progresses, wherein at any given time a new operation may be initiated at a starting stage (the start of the pipeline) while one or more other (earlier initiated) operations are in progress and thus at later stages (in the middle—moving toward the end) of the pipeline).

Pour: To send a file or output from a program to another file or to a device using a pipe.

SUMMARY OF THE INVENTION

The present invention is provided to improve upon storage subsystems. More specifically, the present invention may be provided to improve upon interfacing subsystems for interfacing a storage media controller to a media access channel which couples the storage media controller to a read/write assembly for writing information to and reading information from the storage media. More specifically, the present invention may improve upon read channel interfacing subsystems which interface a disk controller to the read channel which couples the disk controller to a head disk assembly. In order to achieve these objects, one or more aspects of the present invention may be followed in order to bring about one or more specific objects and advantages, such as those noted below.

The present invention, therefore, is directed to a system or method, or one or more components thereof, involving a non-volatile storage subsystem comprising a media I/O controller, a media access channel, and movable storage media. More specifically, the present invention is directed to a non-volatile disk storage subsystem having a read channel coupling a disk controller to a disk head assembly. A read channel interfacing subsystem is provided as part of the storage subsystem, and the read channel interfacing subsystem interfaces a disk controller to the read channel. The read channel interfacing subsystem comprises a set of process units and a pipeline manager. The set of process units includes first, second and third subsets. The first subset is utilized when a disk read operation is carried out via the read channel. The second subset is utilized when a disk write operation is carried out via the read channel. The third subset is utilized when a disk compare operation is carried out via the read channel. Each process unit comprises mechanisms for entering an idle state and for carrying out an operational state flow. The pipeline manager, for each one of the disk read, disk write and disk compare operations, enables and disables each utilized process unit, so each of the utilized process units is done and ready to carry out its operational state flow for a subsequent operation and has poured into a holding register resulting data needed by a dependent process unit within the present operation, all before the occurrence of a predetermined upcoming periodically recurring advance signal.

BRIEF DESCRIPTION OF THE DRAWINGS

The above and other objects, features, and advantages of the present invention are further described in the detailed description which follows, with reference to the drawings by way of a non-limiting exemplary embodiment of the present invention, wherein like reference numerals represent similar parts of the present invention throughout the several views and wherein.

DESCRIPTION OF THE EXEMPLARY EMBODIMENT

Figure 1:
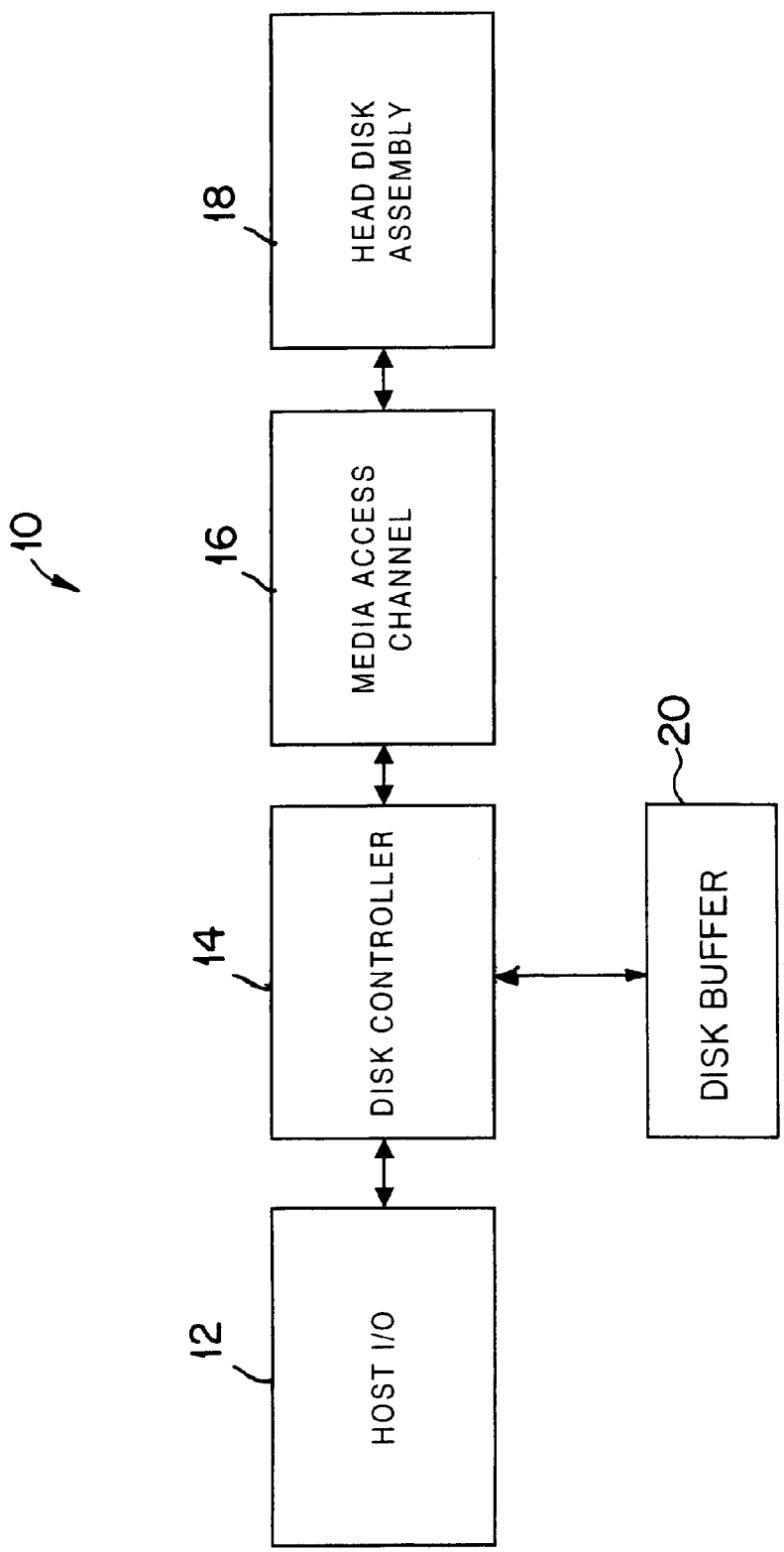
FIG. 1 is a block diagram of a non-volatile storage subsystem, which comprises a hard disk device in the illustrated embodiment.

Referring to the drawings in greater detail, FIG. 1 illustrates a non-volatile storage subsystem 10. The illustrated storage subsystem 10 comprises a hard disk storage device, which comprises a host I/O interface 12, a disk controller 14, a media access channel 16, a head disk assembly 18, and a disk buffer 20. Host I/O interface 12 couples a host computer (not shown) to the illustrated storage subsystem 10, and may comprise, for example, a commercially-available known disk I/O interface such as a SCSI, ESDI, or IDE interface. Disk controller 14 manages data transfers between the host and the movable storage media, which in the illustrated embodiment comprises hard disk media (platters). More specifically, in the illustrated embodiment, the disk media comprises magnetic hard disk storage media. Disk controller 14 facilitates transfers of data to and from the disk media via media access channel 16, which couples disk controller 14 to head disk assembly 18. Head disk assembly 18 comprises, among other components, a disk actuator driver and a read/write head. Disk controller 14 further controls the buffering and caching of disk data with the use of disk buffer 20. Head disk assembly 18 further comprises platters, a spindle motor, the read/write head, and a head actuator mechanism provided in a sealed chamber.

Figure 2:
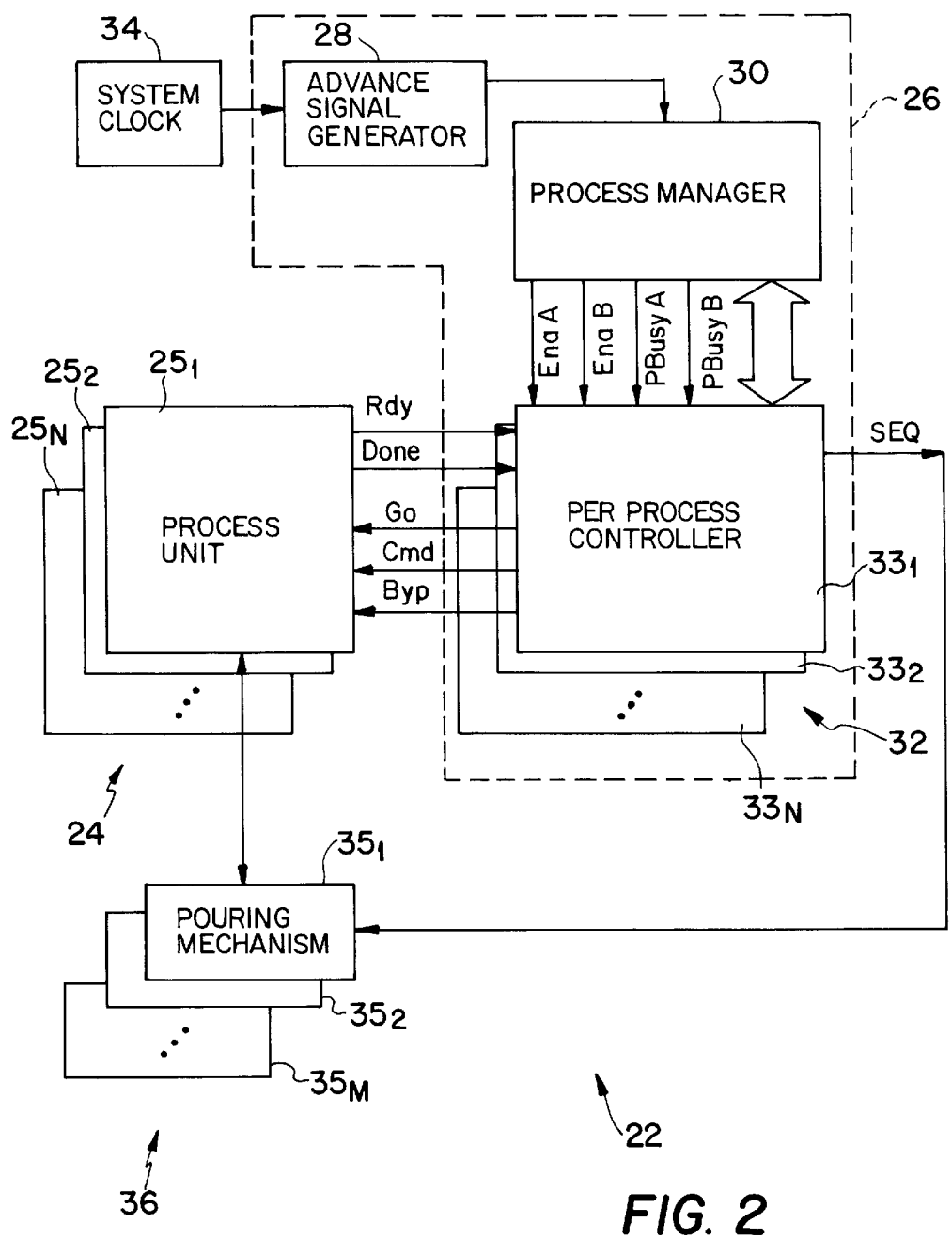
FIG. 2 is a simplified partial block diagram of a read channel pipelining interface in accordance with the illustrated embodiment.

FIG. 2 illustrates a read channel interfacing subsystem 22 which is provided as part of the disk controller 14 illustrated in FIG. 1. Read channel interfacing subsystem 22 comprises a set of process units 24, a pipeline manager 26, and a set of pouring mechanisms 36. The set of process units 24 comprises N process units $25_1$–$25_N$. The set of pouring mechanisms 36 comprises M pouring mechanisms $35_1$–$35_M$ for facilitating the pouring of data in a pipeline involving a subset of the illustrated process units $25_1$–$25_N$. The illustrated pipeline manager 26 comprises an advance signal generator 28, a process manager 30, and a set of per process controllers 32, comprising N per process controllers $33_1$–$33_N$. Process manager 30 manages the enablement of various ones of process units $25_1$–$25_N$ in a given pipeline, by feeding for each process unit an enable signal to a per process controller $33_1$–$33_N$ which corresponds to the process unit. Each per process controller $33_1$–$33_N$ controls the invocation of a corresponding process unit $25_1$–$25_N$. Process manager 30 controls the enablement of various process units for a given operation k, and controls the timing of the enablement of such process units in accordance with prescribed timeslots delineated by certain points in time per the output of advance signal generator 28. Advance signal generator 28 is coupled to and receives a reference clock signal from a system clock 34, and generates a periodically recurring advance signal which is input to process manager 30.

In the illustrated embodiment, process units $25_1$–$25_N$ respectively comprise a fetch unit, a media transfer unit, a disk transfer unit, a RAM transfer unit, a vector generation unit, an error correction unit, and a status unit. Each of those units performs a respective process.

The fetch process is responsible for fetching opcodes from an opcode list (OCL) and checking their validity. The fetch process also fetches buffer pointers from a buffer pointer list (BPL) and checks their validity, and fetches logical block addresses (LBAs) from the buffer and compares each fetched LBA to an expected LBA. The fetch process may also generate a host block sequence tag, and update the buffer pointer when there are multiple disk blocks per host block.

The media transfer process controls read and write controls of the channel. It also controls a bidirectional data bus connecting the controller to the media access channel, and controls certain out-of-band data written to the disk media.

The disk data transfer process controls data transferred to the media access channel, and controls ECC symbol generation (for writes/compares) and ECC syndrome generation (for reads).

The RAM data transfer process is responsible for moving data to and from a RAM provided as part of disk controller 14. The RAM (not shown in the figures) may comprise, for example, a central RAM for holding data being handled by disk controller 14, or may comprise a FIFO, provided within a disk controller 20, e.g., as disclosed in U.S. Pat. No. 5,701,450, the content of which is hereby expressly incorporated by reference herein in its entirety.

The vector generation process is responsible for detecting ECC errors, and generating error locations and vectors for correctable errors. The error correction process is responsible for correcting errors in the read data buffer, which comprises a portion of disk buffer 20. The status process is responsible for transitioning opcodes, and collating status data.

In the illustrated embodiment, each process unit $25_n$ comprises a common signaling protocol for activation and completion notification.

Each process unit $25_n$ is coupled to a corresponding respective per process controller $33_n$ via a plurality of one bit connection lines. More specifically, each process unit $25_n$ comprises a unique ready signal (Rdy) output which is input to a corresponding per process controller $33_n$ and a unique done signal (Done) which is output and received by the per process controller $33_n$. Each per process controller outputs to a corresponding process unit a set of unique signal levels, including a go indication (Go), a command indication (Cmd), and a bypass indication (Byp). When the signal level on any one of these lines is high, the signal is considered to have an "on" or "one" status. Each per process controller $33_n$ receives a plurality of unique inputs from process manager 30, including an enable for sequence A (EnaA), an enable for sequence B (EnaB), a predecessor busy for sequence A (PBusyA), and a predecessor busy for sequence B (PBusyB). Other status indications may be transferred between process manager 30 and each per process controller $33_n$ as indicated by the two-way arrow between process manager 30 and per process controller $33_1$. For example, each per process controller $33_n$ outputs a unique process busy indication indicating that its corresponding process unit is in a busy state. This allows process manager 30 to know when a predecessor process is in a busy state, the negation of which is required for a dependent process unit to be able to execute. The predecessor busy indications for sequences A and B are indicated via respective predecessor busy lines PBusyA and PBusyB. The signal indications on the Rdy, Done, Go, Cmd, Byp, EnaA, EnaB, PbusyA, PBusyB, and the process busy indications extending from each per process controller to process manager 30 are each unique to a respective process unit. While FIG. 2 shows each of these connections as comprising a one bit signal level line, this is not to preclude different implementations of the interface subsystem 22, for example, with firmware or software. The illustrated embodiment contemplates the implementation of the interfacing subsystem 22 on a single application specific integrated circuit (ASIC) comprising all of disk controller 14.

Figure 3:
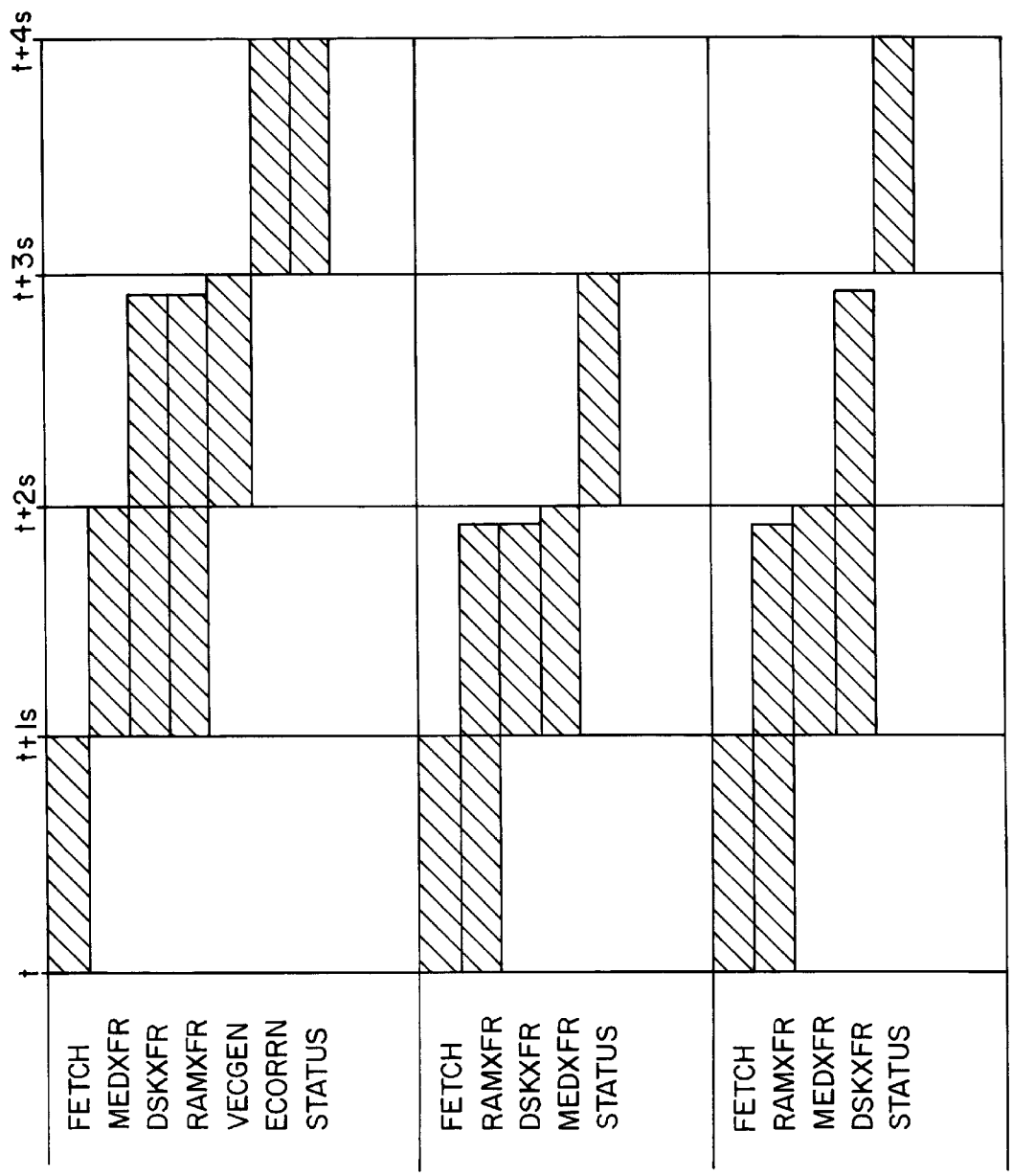
FIG. 3 is a timing diagram representing pipeline stages associated with various disk operations.

FIG. 3. is a pipeline stage diagram illustrating process enable signal timing with respect to certain processes for a disk read operation (top portion), a disk write operation (middle portion), and a disk compare operation (bottom portion). The shaded areas depict time periods (epochs) during which a given process is enabled by process manager 30, by the enable signal indication EnaA or EnaB, depending upon the sequence to which the present operation is assigned. The diagram is segmented into the top, middle, and lower portions. The top portion comprises enable signal indications for fetch, media transfer, disk transfer, RAM transfer, vector generation, error correction and status processes. The middle portion comprises enable signal indications for fetch, RAM transfer, disk transfer, media transfer, and status processes. The lower portion comprises enable signal indications for the fetch, RAM transfer, media transfer, disk transfer and status processes.

For a given operation, certain processes will require data poured from a predecessor process and are thus dependent upon that predecessor process.

Figure 9:
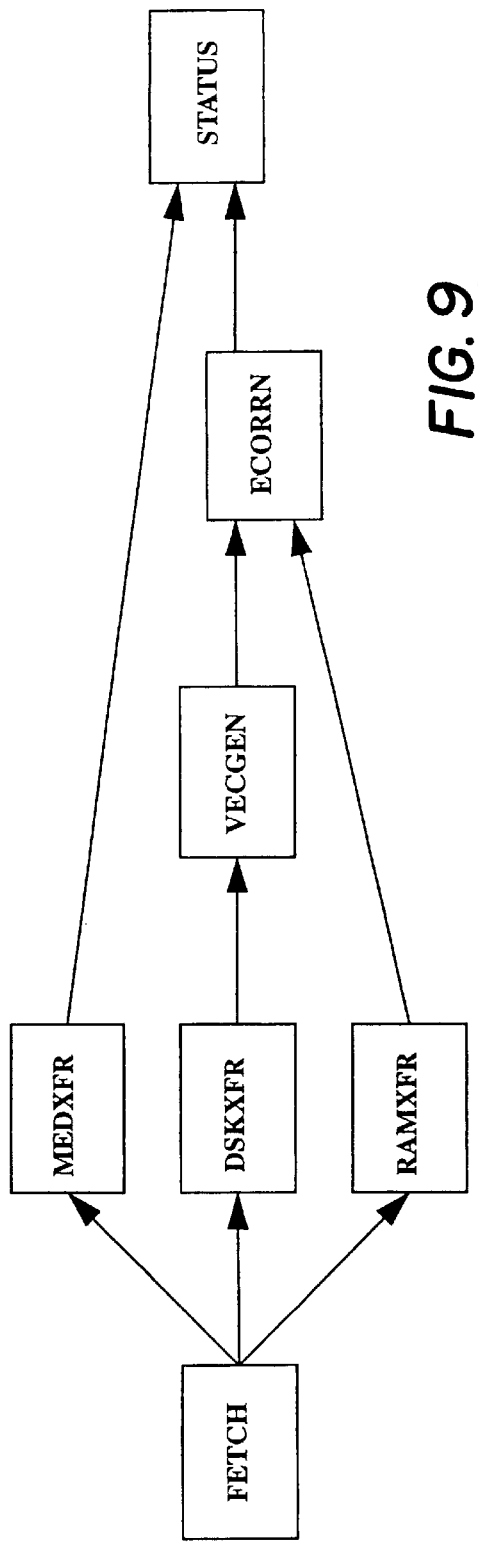
FIG. 9 is a diagram indicating process completion dependencies for a disk read operation.

As shown in FIG. 9, for a read operation, the media transfer, disk transfer, and RAM transfer processes each require data from the fetch process. The vector generation process requires data from the disk transfer process. The error correction process requires data from the vector generation and the RAM transfer processes. The status process requires information from the media transfer and the error correction processes.

Figure 10:
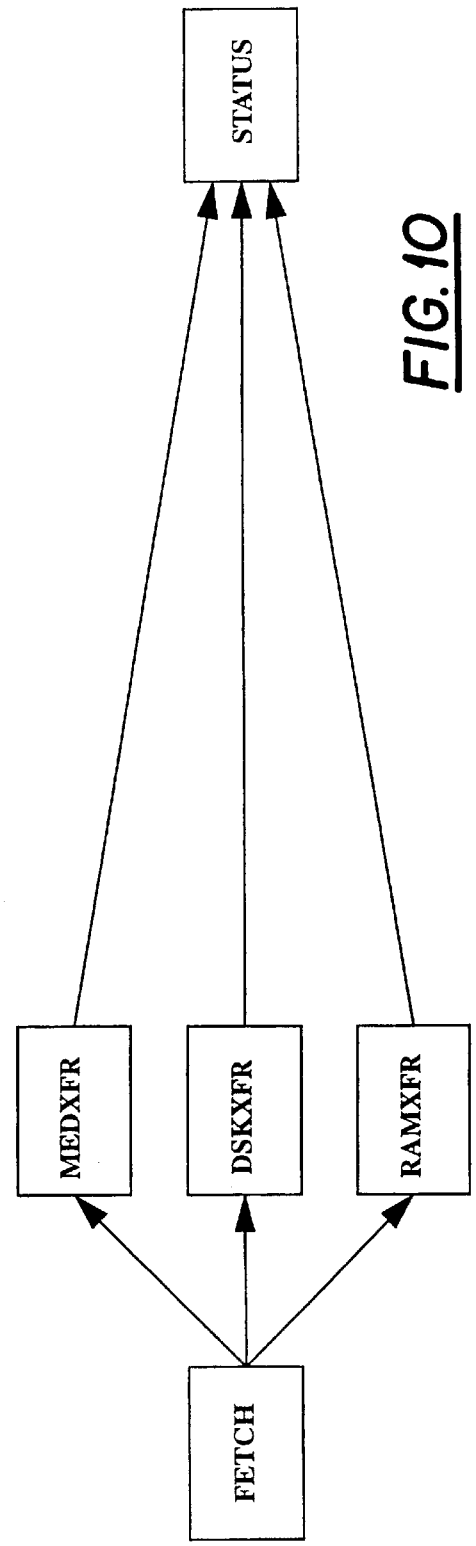
FIG. 10 is a diagram indicating process completion dependencies for write and compare disk operations.

As shown in FIG. 10, for write and compare operations, media transfer, disk transfer, and RAM transfer processes each require data output or poured from a fetch process. The status process requires data output or poured from each of the media transfer process, the disk transfer process, and the RAM transfer process.

The timing of the enable signals are delineated in FIG. 3 by means of vertical lines separating four time periods, i.e., pipeline stages. The first pipeline stage starts at a time t and extends to a time t+1s (s is the stage length in seconds). The second pipeline stage extends from t+1s until t+2s; the third pipeline stage extends from t+2s until t+3s; and the fourth illustrated pipeline extends from t+3s until t+4s. Since the media transfer, disk transfer, and RAM transfer processes each require data poured from a fetch process, and thus must await completion of the fetch process, for a read operation, the fetch process is the only process enabled in the first stage. Commencing at the beginning of the second pipeline stage, each of the media transfer, disk transfer, and RAM transfer processes is enabled. The media transfer process requires less time to complete than the disk transfer and RAM transfer processes. Accordingly, the disk transfer and RAM transfer processes are allotted more time to complete their execution by providing a process enable signal which extends across two pipeline stages.

The vector generation, error correction and status processes require less time to complete, and thus are only enabled for a single pipeline stage in the illustrated embodiment. Since for a read operation, the vector generation process depends upon the media transfer process, the vector generation process is enabled in the third pipeline stage, after completion of the second pipeline stage. The error correction and status processes are each enabled within the same pipeline stage extending from t+3s until t+4s. These processes are allowed to coexist within the same pipeline stage since it is likely the error correction will complete with plenty of time left for the status process to execute using the data it requires from the error correction process within that same pipeline stage. For example, the error correction process may commence and complete its execution within an early portion of the illustrated fourth pipeline stage, and the status process, upon being provided an indication that its predecessor process (the error correction process) is no longer busy, can be executed immediately thereafter and complete its execution well before the completion of the fourth pipeline stage.

For a disk write operation, as shown in the middle portion of FIG. 3, the fetch and RAM transfer processes are each started at the beginning of the first pipeline stage. The fetch process is then enabled for the entire duration of the first pipeline stage. The RAM transfer process is enabled for a duration expiring a predetermined amount of time before the end of the second pipeline stage. The disk transfer processes is also enabled until a time period which stops prior to the end of the second pipeline stage. This is because each of these processes, upon completing or being aborted, will require a certain amount of time to wind up its execution. The maximum estimated time the disk transfer or the RAM transfer processes would require to wind up their operation upon entering a done or an abort state is estimated, and the enable signal is terminated at a time preceding the end of that given pipeline stage by a period equal to this maximum estimated wind-up time.

In the case of the disk write operation as shown in the middle portion of FIG. 3, the media transfer process is enabled for the entire duration of the second pipeline stage, and the status process is enabled for the entire duration of third pipeline stage.

As shown in the bottom portion of FIG. 3, for a disk compare operation, the fetch process is enabled for the entire duration of the first pipeline stage, and the RAM transfer process is enabled starting at the beginning of the first pipeline stage extending until a time preceding the end of the second pipeline stage by an amount of time equal to a maximum wind-up time. The media transfer process is enabled for the entire duration of the second pipeline stage. The disk transfer process is enabled for a period extending from the beginning of the pipeline stage until a time just prior to the end of the third pipeline stage, and thus, terminates at a time preceding the next pipeline stage by an amount of time equal to the maximum wind-up time required for the disk transfer process. The status process is enabled for the entire duration of the fourth pipeline stage.

Figure 4:
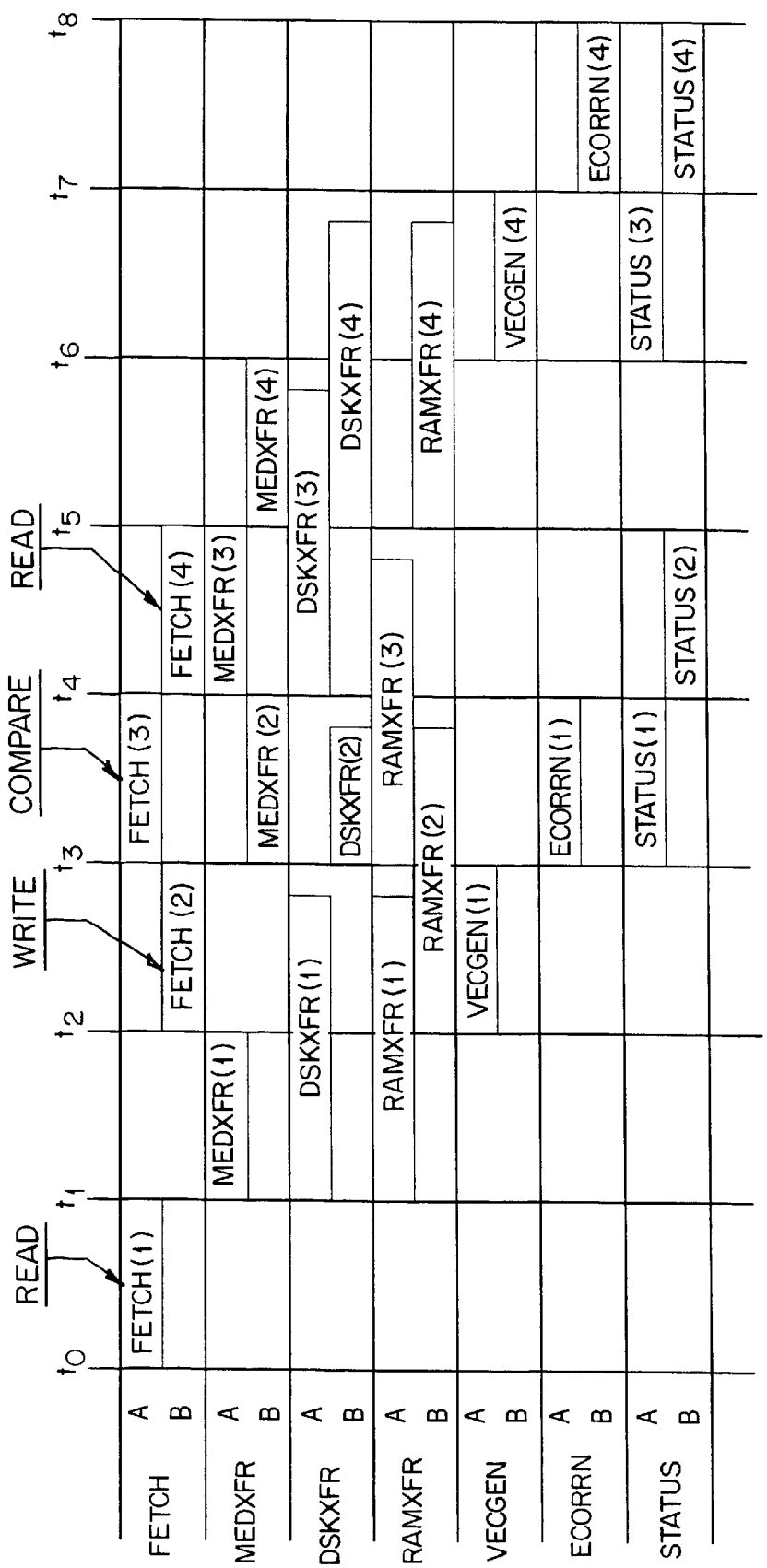
FIG. 4 illustrates another pipeline stage diagram showing four operations being performed on four different blocks.

FIG. 4 is another pipeline stage diagram illustrating the timing of enable signals for the various processes for different operations within a pipeline in the time period $t_{0-t_8}$. A read operation is performed on a first block (1), and that read operation is started with a fetch enable signal for sequence A (fetchEnaA). Other processes utilized in the same read operation include the media transfer process, the disk transfer process, the RAM transfer process, the vector generation process, the error correction process, and the status process. They are positioned within the pipeline in the same manner as shown in FIG. 3. That is, the media transfer process is enabled for the entire duration of the second stage extending from $t_1$ until $t_2$. The disk transfer process is enabled from $t_1$ until a time preceding $t_3$ by an amount equal to a maximum wind-up time. The RAM transfer process is also enabled from $t_1$ until a time preceding $t_3$, by an amount of time equal to the maximum wind-up time for that process. The vector generation process is enabled from the beginning of the stage starting at $t_2$ and ending at time $t_3$. The error correction process is enabled starting at $t_3$ and ending at $t_4$. The status process is enabled starting at $t_3$ and ending at $t_4$.

A subsequent operation, comprising a disk write operation, is enabled immediately after the start of the read operation on block #1. The subsequent write operation is performed on a second block (block #2), and is commenced with a fetch enable signal for sequence B (fetchEnaB) as well as a RAM transfer enable signal for sequence B (RAMxfrEnaB). The other processes forming that operation are enabled in accordance with the relative timing as illustrated in FIG. 3. Thus, the media transfer and disk transfer processes are enabled starting at the next stage (at $t_3$) following the stage at which the fetch and RAM transfer processes are enabled (at $t_2$), and the status process is enabled (at $t_4$) at the stage immediately following the enablement of the media transfer and disk transfer processes. Also, for the disk write operation being performed on block #2, the disk transfer and RAM transfer processes are enabled until a time which stops short of a next stage by an amount of time equal to their respective maximum wind-up times.

A third disk compare operation is performed on a third block (block #3), and is started with an enable signal for a fetch process for sequence A (fetchEnaA) extending between the times $t_3$ and $t_4$ and an enable signal for the RAM transfer process for sequence A (RAMxfrEnaA) extending from $t_3$ until a maximum wind-up time before the time $t_5$. The media transfer and disk transfer processes for block #3 are enabled starting at the next stage, i.e., at time $t_4$. The status process for block #3 is enabled starting at time $t_6$, and ending at time $t_7$. In the same manner as shown in FIG. 3, for a disk compare operation, RAM transfer and disk transfer processes performed on block #3 are enabled for almost two complete stages, stopping short of the end of the second stage by an amount equal to a maximum wind-up time for the respective process.

A subsequent operation, shown in FIG. 4, comprises a read operation performed on a fourth block (block #4). That process starts with a fetch enable signal for sequence B (fetchEnaB), starting at time $t_4$.

As can be seen in FIGS. 2–4, each operation involves process manager 30 sending to appropriate per process controllers 33 enabling signals for corresponding processes utilized in that operation. Those enable signals are timed in relation to each other (i.e., positioned within the pipeline), in the manner as shown in FIG. 3. This relative positioning of the processes utilized in a particular operation helps insure that a process utilized in a given operation will be complete by a particular deadline corresponding to an end of a stage within the pipeline. The stages in FIG. 4 are delineated by the timelines $t_0$–$t_8$. Those timelines correspond to the times at which advance signals are output by advance signal generator 28 shown in FIG. 2 to process manager 30. Certain processes, such as the disk transfer process and the RAM transfer process, will require an amount of time to wind-up after they are terminated and complete their execution or when they are aborted. Those processes are given an amount of time equal to a maximum wind-up time before the deadline, i.e., the appropriate ending advance signal ($t_5$ for the RAM transfer enable signal for sequence A for block #3).

Processes which are enabled for more than one stage, such as the RAM transfer process for block #1, may overlap with another enable signal for the same process. Two separate enable signals may be concurrently identified for a given process, and are uniquely identified by a sequence indication of A or B in the illustrated embodiment. Accordingly, an enable signal for a RAM transfer process for block #1 for sequence A will not be confused with an enable signal for the same process for block #2 due to a different sequence identification B. For the stage following the RAM transfer enabling signal for block 1, which extends between time $t_3$ and $t_4$, a subsequent RAM transfer process enablement having a sequence indication of A is also easily distinguished from the RAM transfer enabling signal for block #2 for sequence B.

As noted above, the relative positions of the processes making up a particular operation remain constant as shown in FIGS. 3 and 4. Alternatively, individual processes within a particular operation can be moved up in the pipeline to better utilize the band width of the pipeline. For example, the fetch enable signal for block #4, having a sequence indication of B, could be moved up to the stage extending between $t_3$ and $t_4$. In that case, the media transfer enable signal for block #4 which is in the stage extending between $t_5$ and $t_6$ would remain in the same stage, since it should not overlap with a single stage enablement of the same process for block #3, which extends between $t_4$ and $t_5$. The disk transfer process for block #4, which is enabled in the stages extending between $t_5$ and $t_7$, could also be moved up one block, to start at time $t_4$, since it is dependent upon only the fetch process for block #4, which will now have completed its operation by a deadline defined at $t_4$.

Figure 5:
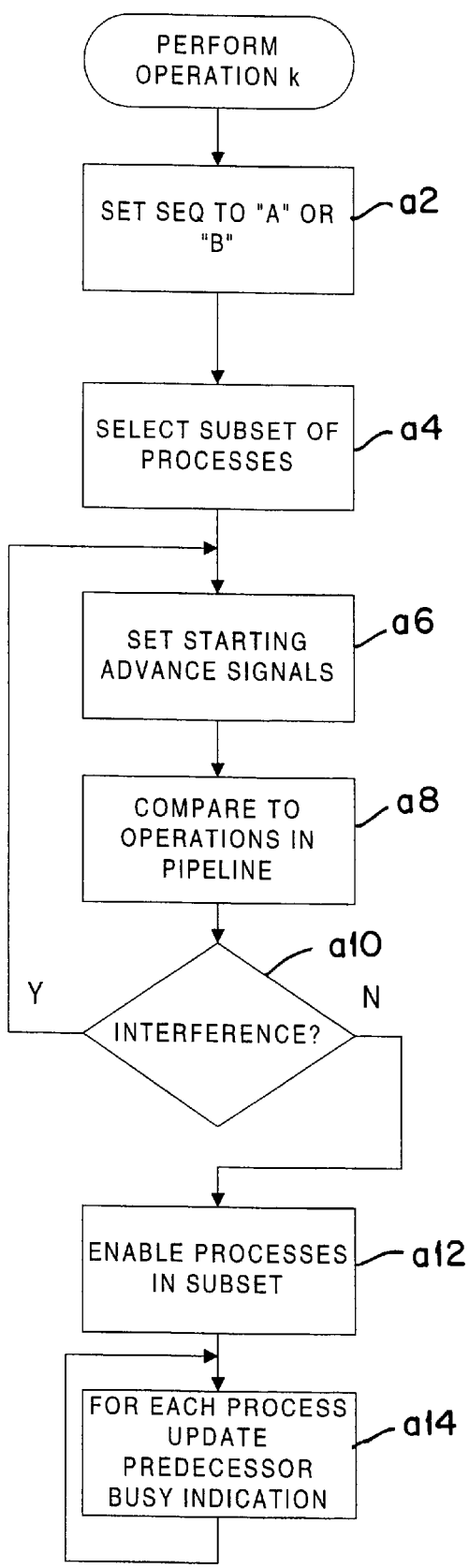
FIG. 5 is a flowchart of a process performed by the process manager to perform a given operation k.

FIG. 5 is a flow chart of at least a portion of the processing performed by process manager 30 with respect to the performance of a given operation k. In a first action a2, a sequence indication for this given operation is set to either A or B. This sequence indication is set so that sequential operations alternate their sequence indications between A and B. Subsequently, at a4, a subset of the processes needed for the operation k is selected. In action a6, the respective starting advance signals for each of the processes for operation k are set. That is, the advance signals corresponding to the start of the enabling signal for each process are set in accordance with the enable signal timing as shown in FIG. 3 for a disk read, disk write, or disk compare operation.

In a subsequent action A8, the present operation k is compared to other operations in the pipeline. In action a10, a determination is made as to whether one or more processes within the present operation k interferes with another process of another operation. For example, interference may occur if a fetch process is enabled for block #1, and a subsequent operation attempts to enable that process for block #2 during the same stage, starting at the same starting advance signal. Such overlapping of process enablement can only occur when the process is enabled for two stages and the conflicting process enablements have different sequence indications.

In action a12, the processes in the utilized subset are enabled. Thus, for a disk read operation, the fetch, media transfer, disk transfer, RAM transfer, vector generation, error correction, and status processes are enabled. In action a14, process manager 30 updates its predecessor busy indication for each process. Thus, when the operational state of a predecessor to a process with a sequence indication of A is changed, the PBusyA output of process manager 30 will be changed accordingly to indicate that its predecessor is or is not busy.

Figure 6:
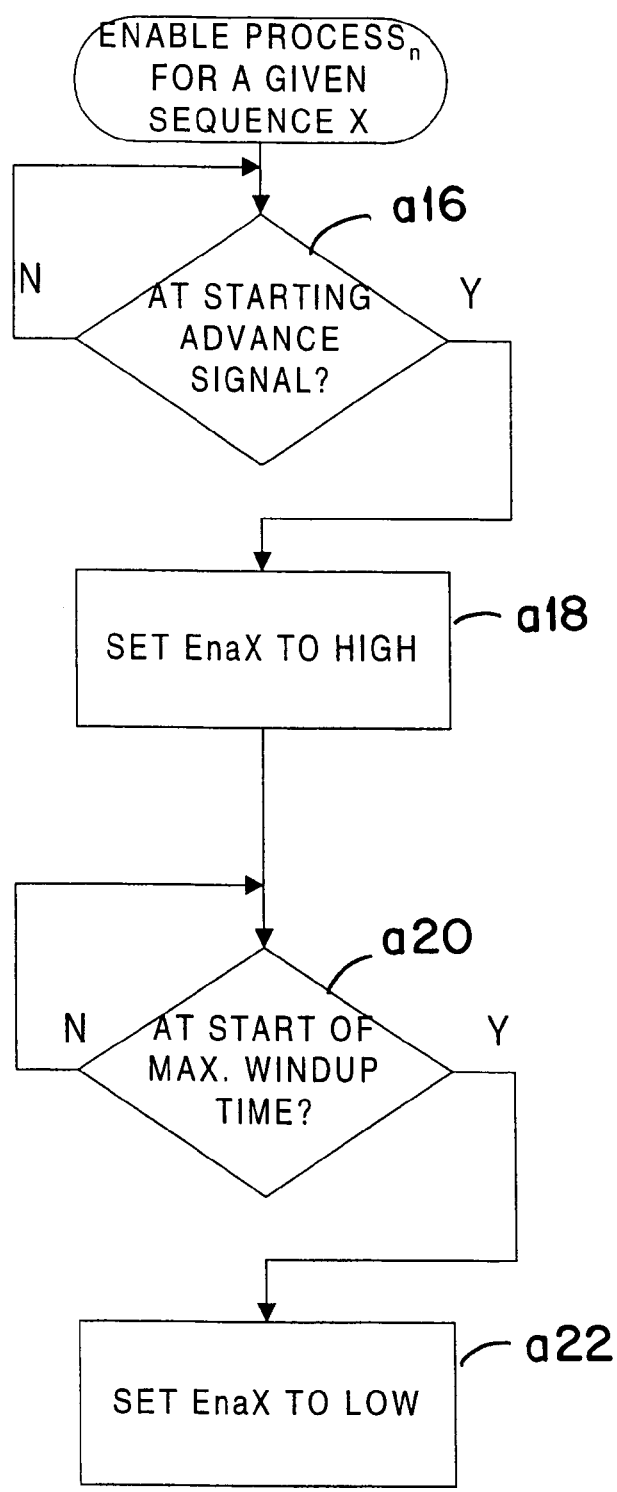
FIG. 6 is a flowchart of a process performed by the process manager for enabling a given process n for a given sequence X.

FIG. 6 illustrates generally the process performed when a given processor n is enabled for a given sequence X (X=A or B). In an initial action a16, a determination is made as to whether the present point in time coincides with the starting advance signal for process n. Referring to FIG. 4, for the fetch process being performed on block #2 for sequence B, the starting advance signal for that process would be at time $t_2$.

Then, at action a18, the enable signal level for that process EnaX is set to a high value. At action a20, a determination is made as to whether the present time corresponds to the start of the maximum wind-up time, which is the amount of time preceding an ending advance signal designated for that particular process. In the case of the fetch process being performed on block #2 for sequence B, as illustrated in FIG. 4, the ending advance signal coincides with time $t_3$, and the maximum wind-up time would equal to 0 for that process. Should the process be the disk transfer process on block #2 for sequence B, the starting advance signal would be at time $t_3$, and the ending advance signal would be at time $t_4$, while the maximum wind-up time would commence at a time equal to t4 minus the maximum windup time for the disk transfer process. After the determination is made at action a20 that the start of the maximum wind-up time has been reached, the process proceeds to action a22, where the enable level EnaX is set to a low value.

Figure 7:
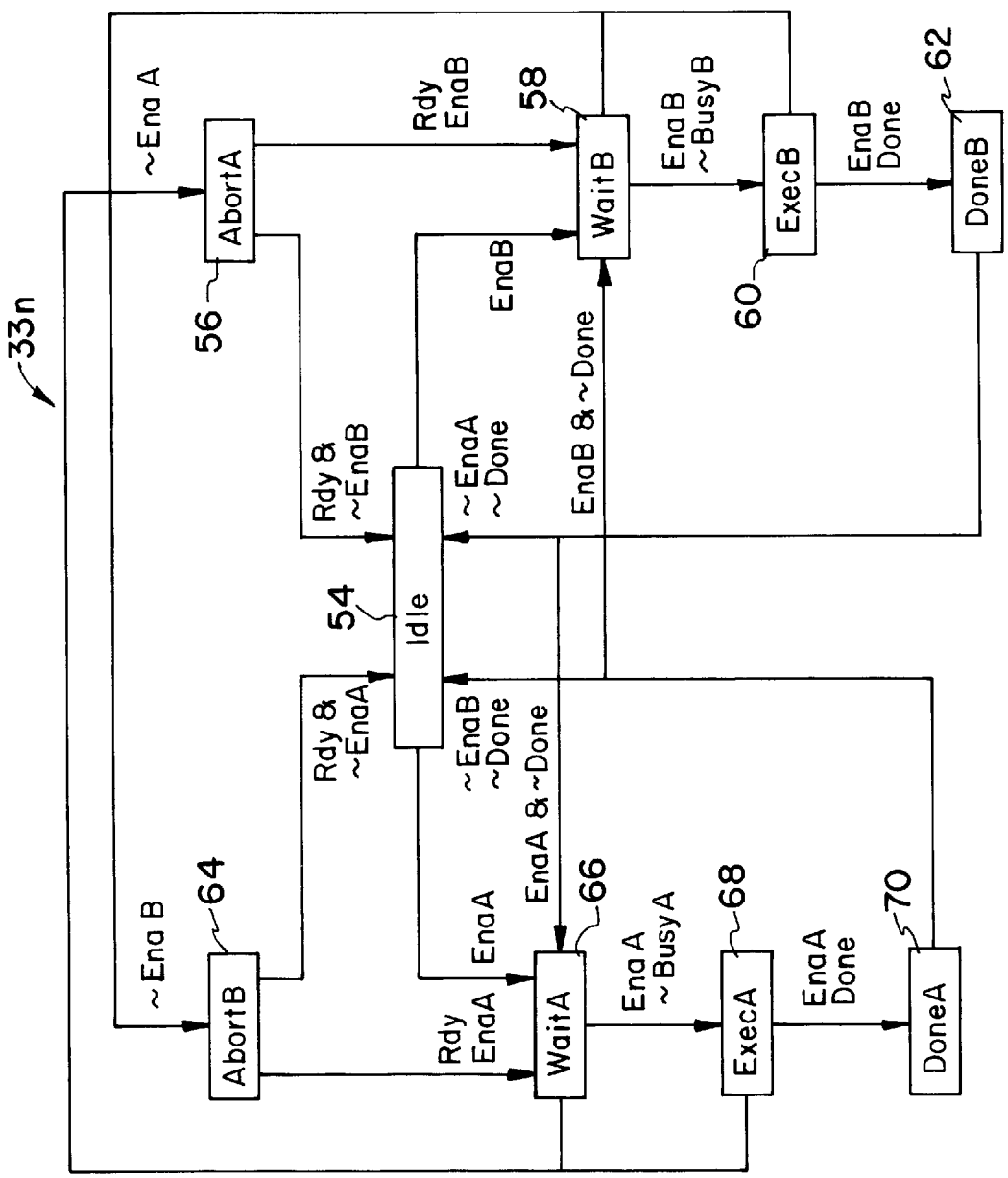
FIG. 7 is a per process controller state diagram.

FIG. 7. is a state diagram of the per process controller $33_n$ illustrated in FIG. 2. When per process controller $33_n$ is in an idle state 54, it is in an initial/reset state. Upon the receipt of a high level for either EnaB or EnaA, the per process controller will move from idle state 54 to either of a WaitB state 58 or a WaitA state 66. In either of the WaitA or WaitB states, per process controller $33_n$ will synchronize the process' invocation with respect to its successor and predecessor processes. The process may not start if its predecessor is still busy, since an output from the predecessor process is required for its invocation. Similarly, the current process may not start if its successor is still busy since the successor is still using output from the previous invocation of the current process. When per process controller $33_n$ is in the state WaitA, the variable Seq is set to 0. When the per process controller 33n is in state WaitB, Seq is set to 1. The Busy variable is asserted in each of these states.

If the process is not busy for the given sequence (sequence B when the process controller is in the WaitB state 58), and the process is enabled for that sequence, the per process controller moves from state WaitB 58 to the execution state ExecB 60 or from state WaitA 66 to state ExecA 68. In the ExecA and ExecB states, the process is allowed to execute. Accordingly, the signal Go is asserted for as long as per process controller 33n is in either the ExecA or the ExecB states and the process busy variable BusyA or BusyB remains asserted in each of these states.

The ExecA and ExecB states are the execution states for the process. Upon the assertion of the enable signal for the given sequence (EnaA or EnaB) and the assertion of the Done status of the process, the per process controller will leave the execution state (ExecA or ExecB). The signal Go for the given process is only asserted in these states. The Busy signal level for the given process remains asserted in these states.

The DoneA and DoneB states 70 and 62 are the done states for the process. The signal Go for that process is negated in these states. Per process controller 33n enters these states when the process asserts the Done signal, indicating that it has completed the current invocation. Per process controller 33n only exits this state when Done is again negated. Busy is negated in each of states DoneA and DoneB.

The states AbortA and AbortB are entered when the enable signal is negated, indicating that the process must be aborted. The per process controller 33n remains in one of these abort states until the ready signal Rdy is asserted indicating that the process is ready and in its corresponding idle state.

Figure 8:
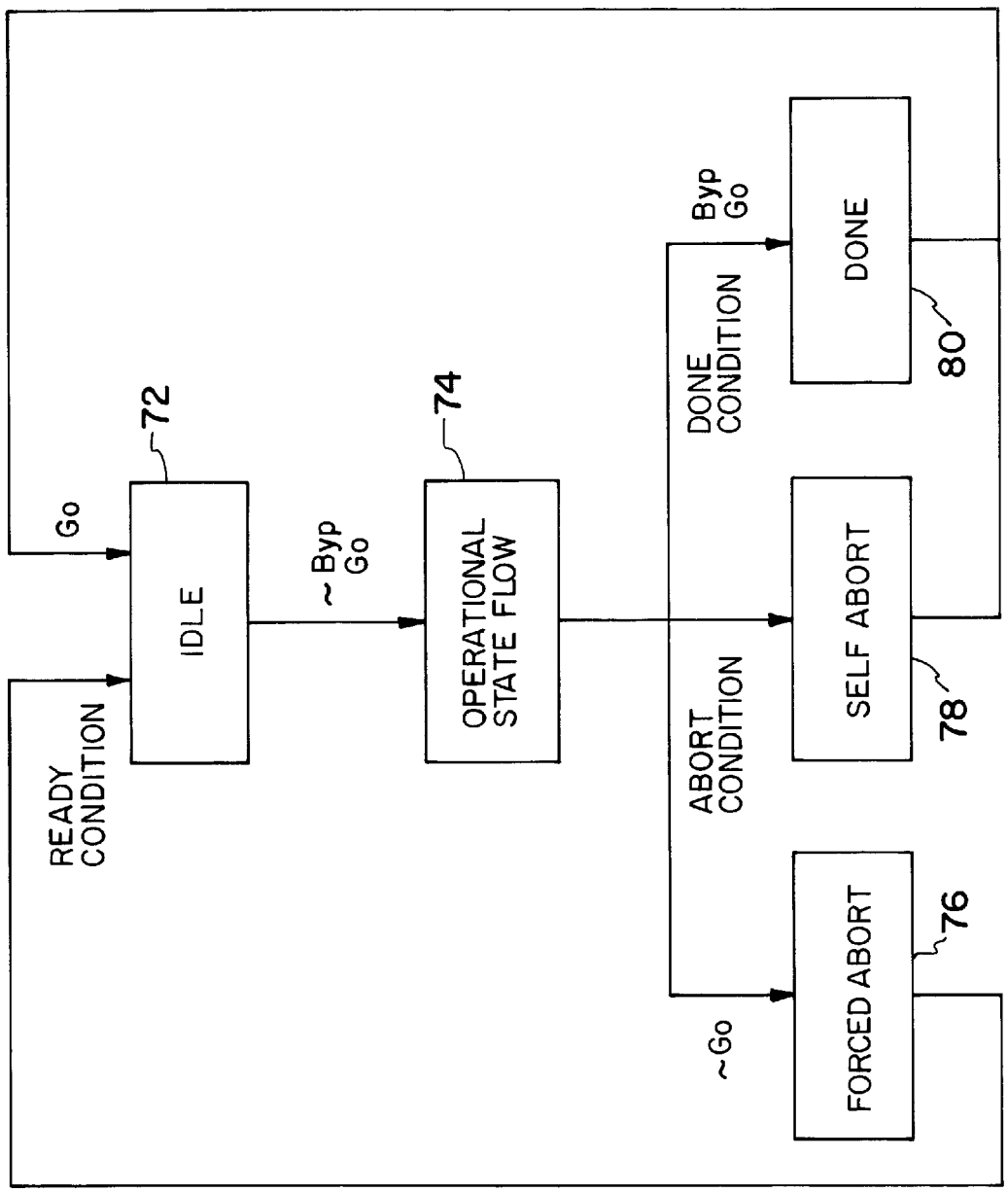
FIG. 8 is a process state diagram.

FIG. 8 is a state diagram of a process. When a process is in an Idle state 72, it is in its initial/reset state. The process exits this state and enters operational state 74 when it receives a Go signal from its corresponding per process controller. The process returns to this state when the Go signal is negated. In certain cases, the process will return to Idle via a forced abort state 76. While in the Idle state 72, the process unit will assert the Rdy signal. When the process unit is in any of the other states, the Rdy signal will be negated.

The Done state 80 of a process unit is the final state for all processes. The process unit enters this state if it runs to completion. In this state, the process unit asserts the Done signal and maintains it asserted as long as it is in this state.

If the Go signal is negated before the process unit completes, then it will not enter the Done state 80. The process unit will remain in the Done state 80 until the negation of the signal Go. While in the Done state 80, the process unit also asserts its Done status output.

The Forced Abort state 76, in the illustrated embodiment, is an optional state. That state is entered when the Go signal is negated while the process unit is in operational state 74. This state is intended for process units which cannot abort immediately, but have to wait on some other event. For example, a RAM transfer process needs to wait on a burst transfer completion before it can proceed to the idle state 72, since there is no mechanism for aborting a burst transfer.

A Self Abort state 78 is provided, which is optional as well. If the process unit detects conditions which do not allow it to continue, it will then enter this state. For example, a disk transfer process might detect a data sync time-out which does not allow it to continue to the Done state 80.

The process unit may be configured so that during its operational state flow 74, it will determine the completion status of prerequisite processes by examining their respective done bits. If the done status has not been set for those prerequisite processes, then the present process unit immediately enters Self Abort state 78. In the Self Abort state 78, the process unit asserts the Done signal for that particular process unit.

The Operational State Flow 74 comprises the acts which will be executed by each of the process units. For example, a RAM transfer process unit 12 performs functions needed to move data to and from a RAM provided within disk controller 14.

A Go signal is a go command for a given process unit. When asserted, the process unit transitions from its idle state into its operational states, i.e., Operational State Flow 74. During this transition, the output status of the process unit is also cleared. If the Go signal is negated while the process is in the Operational State Flow 74, the process unit returns immediately to its Idle state 72. When the process has run to completion, it enters Done state 80 and asserts the Done signal. It remains in the Done state 80 until the Go signal is negated. The Byp signal is a bypass signal for a given process unit. If this signal is asserted when the Go signal is asserted, then the process unit proceeds directly to its Done state 80. This Byp signal may be derived from a corresponding bypass bit in a process bypass control register which may be provided as part of disk controller 14.

Referring to FIG. 2, the Seq signal indicates the sequence number for the current invocation of the process unit. It is used to configure the process unit's input source and output destination registers, per the pouring mechanisms $35_1$–$35_M$. The command Cmd signal may comprise a signal level or a vector. If a process unit is capable of performing more than one type of operation, this signal or vector is used to indicate which operation the process unit should execute.

The Done signal is asserted by the process unit when it enters the Done state 80. The Rdy signal indicates that the process unit is in its idle state. This signal is primarily used for the purpose of indicating to the per process controller that the process unit is idle.

FIG. 9 represents, in the form of a directed acyclic graph, completion dependencies of processes performed in a read operation. Similarly, FIG. 10 represents, in the form of a directed acyclic graph, completion dependencies of the processes used in write and compare operations.

Referring to FIG. 9, a fetch process is a predecessor of the media transfer, disk transfer and RAM transfer processes. Thus, the media transfer, disk transfer and RAM transfer processes cannot commence until completion of the fetch process. The media transfer process is a predecessor process to the status process. The disk transfer process is a predecessor process to the vector generation process. The RAM transfer process is a predecessor process to the error correction process. The vector generation process is also a predecessor process to the error correction process. The error correction process is a predecessor process to the status process.

Referring to FIG. 10, the fetch process is again a predecessor process to the media transfer, disk transfer and RAM transfer processes, each of which is a predecessor to the status process.

Completion dependencies, such as those shown in FIGS. 9 and 10, arise in various situations. For example, when performing a read, a status process cannot begin until it has been supplied with status data from the error correction process, while when performing a write operation, the status process cannot begin until it has been supplied with status data from the media transfer process.

Process manager 30 controls the enablement of the processes so that a given process will not start unless its predecessors have been completed. However, a given process unit will need to check the successful completion status of its predecessors. For example, an error correction process must check that both the vector generation and RAM transfer processes have set their Done bits before continuing. If either or both of the vector generation and RAM transfer processes have not set a Done status, then the error correction process proceeds to its Self Abort state. The status process, however, need not enter an Abort state. Rather, it can simply add the status of the Done bit of its predecessors into the status list entry for posting.

FIG. 10 is a simplified diagram of a portion of a pipeline comprising process units a, b, and c coupled in sequence via pouring mechanisms 35$i$ and 35$ii$. More specifically, a process unit 25$a$ outputs data to a pouring mechanism 35$i$, which provides data to a second process unit 25$b$. The second process unit 25$b$ outputs or pours data to a second pouring mechanism 35$ii$, which provides input data to a third process unit 25$c$. Process units 25$a$, 25$b$, and 25$c$ each comprise corresponding inputs and outputs including Go, Cmd, and Byp inputs and Done and Rdy outputs. Pouring mechanism 35$i$ comprises a sequence A holding register 90$i$, a sequence B holding register 92$i$, and a multiplexer 94$i$. Second pouring mechanism 35$ii$ comprises a sequence A holding register 90$ii$, a sequence B holding register 92$ii$, and a multiplexer 94$ii$. Each of holding registers 90$i$ and 92$i$ receives data from first process unit 25$a$ and outputs data to multiplexer 94$i$. Sequence A holding register 90$i$ receives data output by process unit 25$a$ when the sequence signal Seq$_a$ is asserted (i.e., a high level) and a sequence B holding register 92$i$ receives data output by process unit 25$a$ when the sequence signal Seq$_a$ is negated (i.e., a low level). The sequence signal Seq$_a$ is a sequence signal unique for process unit 25$a$, is output by a per process controller 33$a$, and corresponds to process unit 25$a$.

The sequence signal for the second process unit 25$b$ is input to the control input of multiplexer 94$i$. When the sequence signal Seq$_b$ is a high level, indicating sequence A, multiplexer 94$i$ will output the data from holding register 90$i$. When sequence signal Seq$_b$ is low, corresponding to sequence B, multiplexer 94$i$ will retrieve and output the data from sequence B holding register 92$i$. Accordingly, as the sequence signals Seq$_a$ and Seq$_b$ each alternate between high and low levels, the invocations of process unit 25*b* pertaining to each of the respective sequences A and B are performed on data unique to sequence A or sequence B. That is, data corresponding to an invocation of a process for sequence A will be maintained in the sequence A holding registers 90*i* and 90*i*, while the data poured during sequence B invocations of the process will be held in the sequence B holding registers 92*i* and 92*ii*. These separate sets of information will be forwarded to the subsequent process 25*b* or 25*c* when the corresponding sequence indication is given by the appropriate sequence signal seq$_b$ or seq$_c$.

Figure 11:
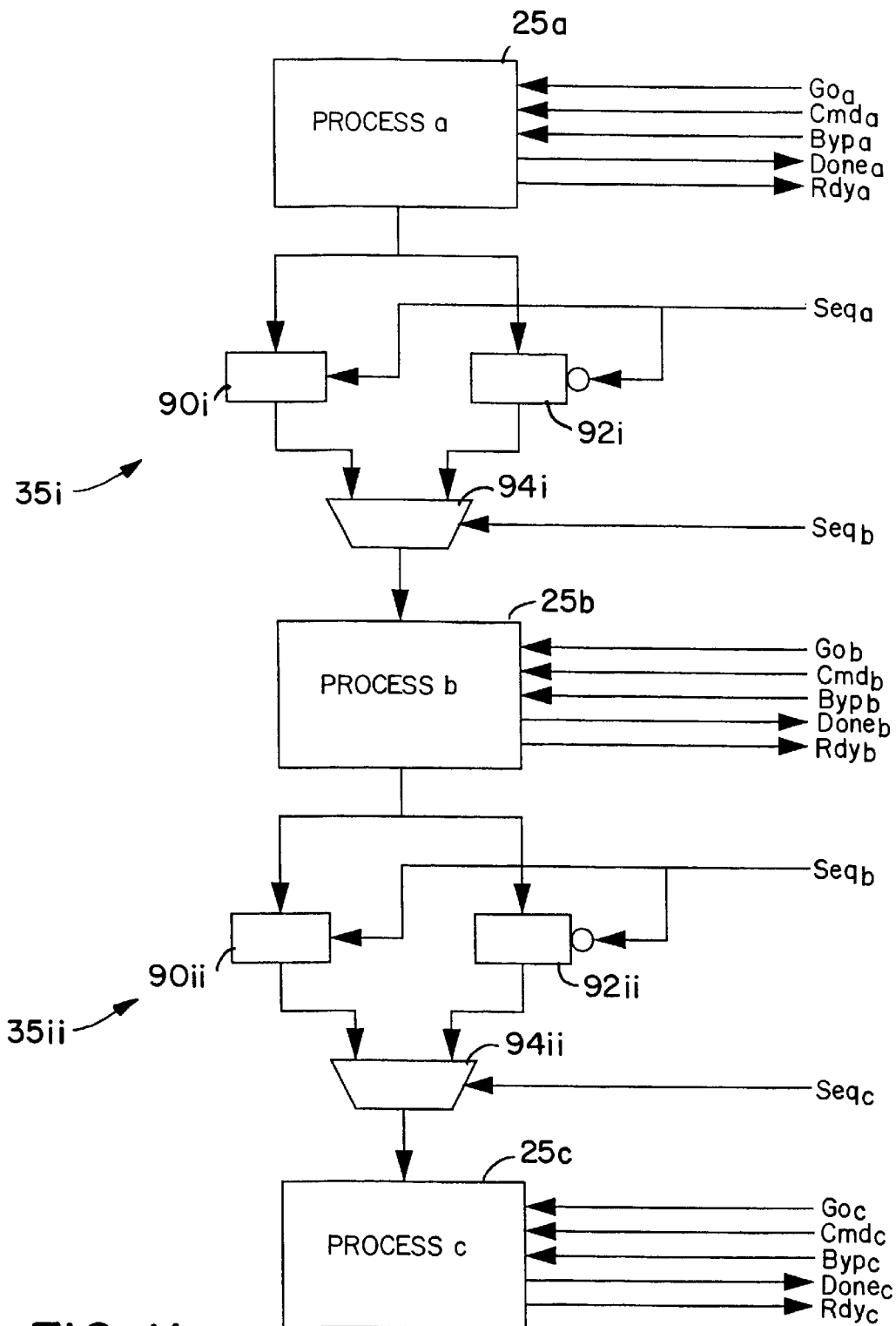
FIG. 11 is a simplified diagram of pouring mechanisms coupled between certain process units to form a pipeline.
Figure 12:
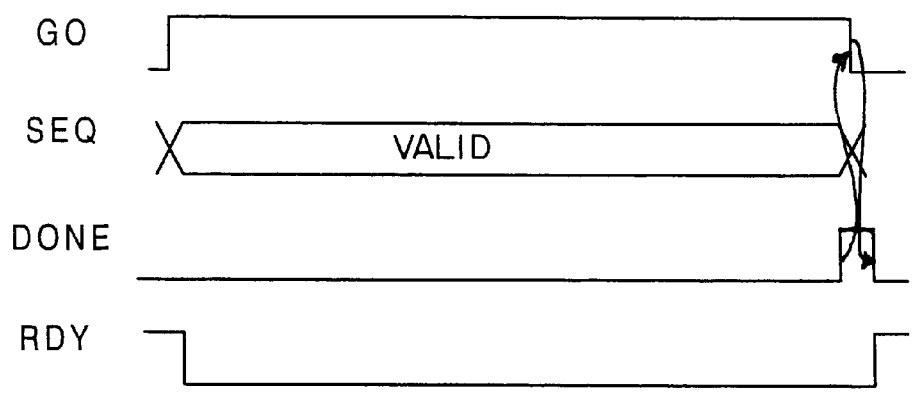
FIG. 12 is a waveform diagram showing select signals corresponding to the subsystem diagram shown in FIG. 8.

FIG. 12 is a waveform diagram illustrating select I/O and process control signals referred to, among other places, in FIG. 11. When the per process controller 33 for a given utilized process asserts a Go signal, changing the level of the Go signal from a low to a high level, the sequence indication in accordance with the corresponding sequence signal is considered valid. When the process unit is done, it outputs a done indicating pulse, which, when received by the per process controller 33$_n$ will move the per process controller 33 to a DoneA state 70 or a DoneB state 62, at which point the Go signal will be negated, i.e., returned to a low level. The Done signal is then negated again, and the ready signal is asserted, at which point the per process controller will return to its Idle state 54.

Figure 13:
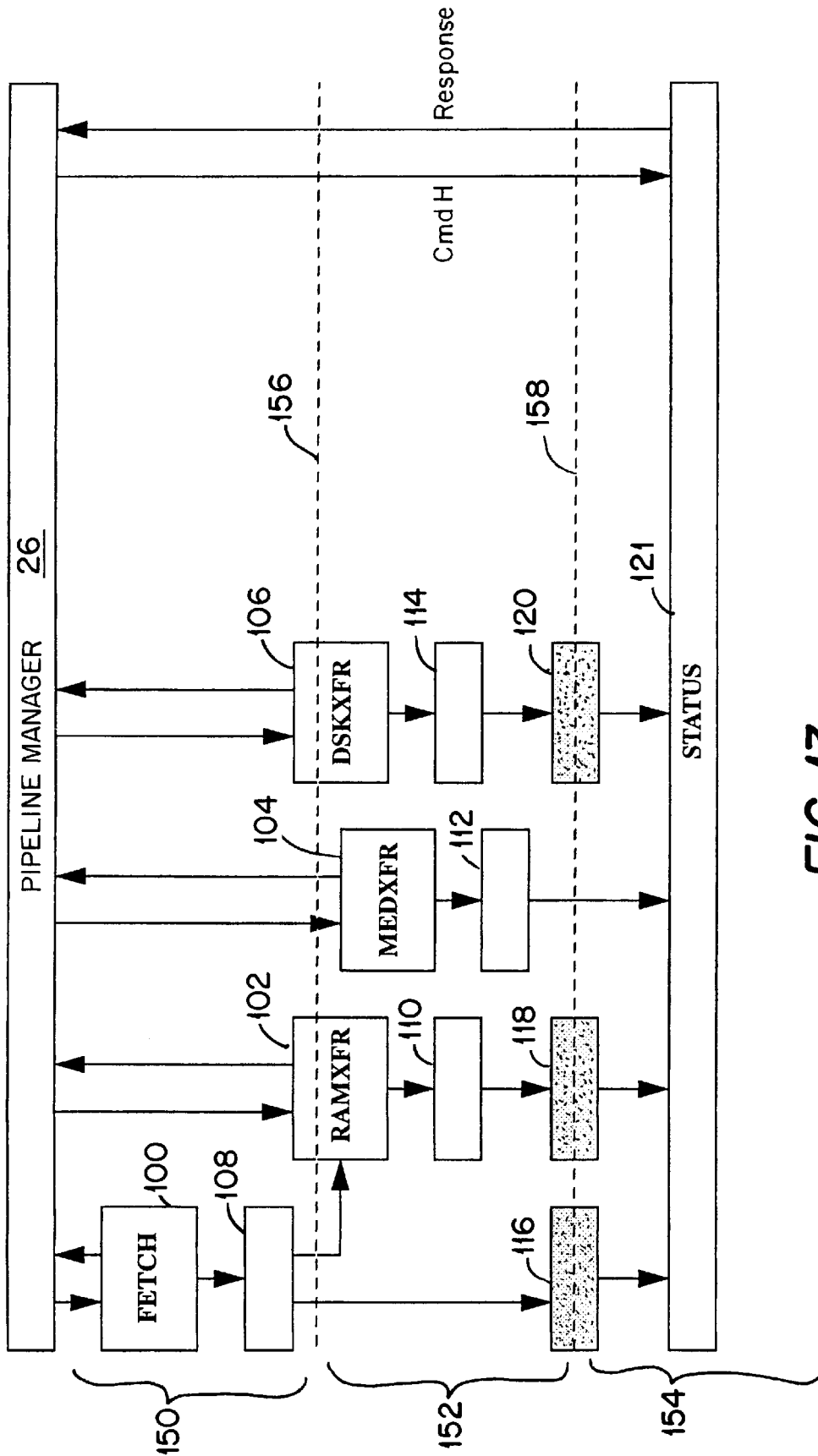
FIG. 13 illustrates a disk write operation pipeline.

FIG. 13 illustrates a write operation pipeline demonstrating the data flow between various processes involved in a write operation. Pipeline manager 26 invokes the fetch process 100 within a first pipeline stage 150, which outputs data to a holding register 108 before completion of the first pipeline stage 150, and thus, before an advance signal 156. Upon the issuance of advance signal 156, by advance signal generator 28, the appropriate enable and Go signals are asserted, causing the RAM transfer process 102, media transfer process 104, and disk transfer process 106 to each be executed during the second pipeline stage 152. RAM transfer process 102 obtains data poured from fetch process 100 into a data holding register 108, and outputs data into a holding register 110. Media transfer process 104 outputs data into a holding register 112. Disk transfer process 106 outputs data into a holding register 114. Each of the processes including RAM transfer process 102, media transfer process 104, and disk transfer process 106 outputs data into its respective data holding register 110, 112, and 114 during the second pipeline stage 152, and before the occurrence of the pipeline stage end which is signaled by the advance signal 158. Certain processes are provided with a second holding register into which the output data will be transferred upon the occurrence of the advance signal 158, so that the initial holding register will be empty and available for another invocation of that same process for the alternate sequence indication. In the illustrated embodiment for a write operation, those processes include the fetch process 100, the RAM transfer process 102, and the disk transfer process 106. They each include a second holding register 116, 118 and 120, respectively. Status data left in a first stage holding register 108, 110 and 114 is transferred to a corresponding second stage holding register 116, 118 and 120 simultaneously with the advance signal 158 marking the end of that pipeline stage and the beginning of a new pipeline stage. During the new pipeline stage, starting at advance signal 158, each of fetch process 100, RAM transfer process 102, and disk transfer process 106 may be executing in another operation, having an alternate sequence number assignment.

Referring to FIG. 4, for example, the fetch process for block #2 is invoked during the pipeline stage extending between $t_2$ and $t_3$ which corresponds to the first pipeline stage 150 in FIG. 13. The next pipeline stage extending between $t_3$ and $t_4$ in FIG. 4 corresponds to the second pipeline stage 152, during which the fetch process is not invoked. However, to be ready for a subsequent invocation of the fetch process during the third pipeline stage, which corresponds to the time between $t_4$ and $t_5$, the data stored in the initial stage holding register 108 is transferred to the second stage holding register 116, freeing up the initial stage holding register 108 for the subsequent invocation of the fetch process.

There is no need for a second stage holding register for the media transfer process 104 for a write operation as shown in FIG. 13, since the media transfer process 104 is invoked during the second pipeline stage 152, and a media transfer process will not be performed for a given sequence for two consecutive pipeline stages. On the other hand, a RAM transfer process 102, a portion of which is performed during the second pipeline stage 152, may be immediately invoked in the next coming pipeline stage 154 for the same sequence. See, for example, FIG. 4, which illustrates a RAM transfer for block #1 being performed during pipeline stages extending between $t_1$ and $t_3$ for a sequence A operation, and a RAM transfer for block #3 being performed during pipeline stages extending between a time $t_3$ and $t_5$ for a sequence A operation as well. In that case, second advance signal 158 corresponds to the time $t_3$ in FIG. 4, at which point the data in the initial stage holding register 110 is transferred to the second stage holding register 118, thus freeing up the initial stage holding register 110 for a sequence A operation of RAM transfer process 102, during the next pipeline stage 154.

Disk transfer process 106 is provided with first and second stage holding registers 114 and 120, respectively, for similar reasons.

Figure 14:
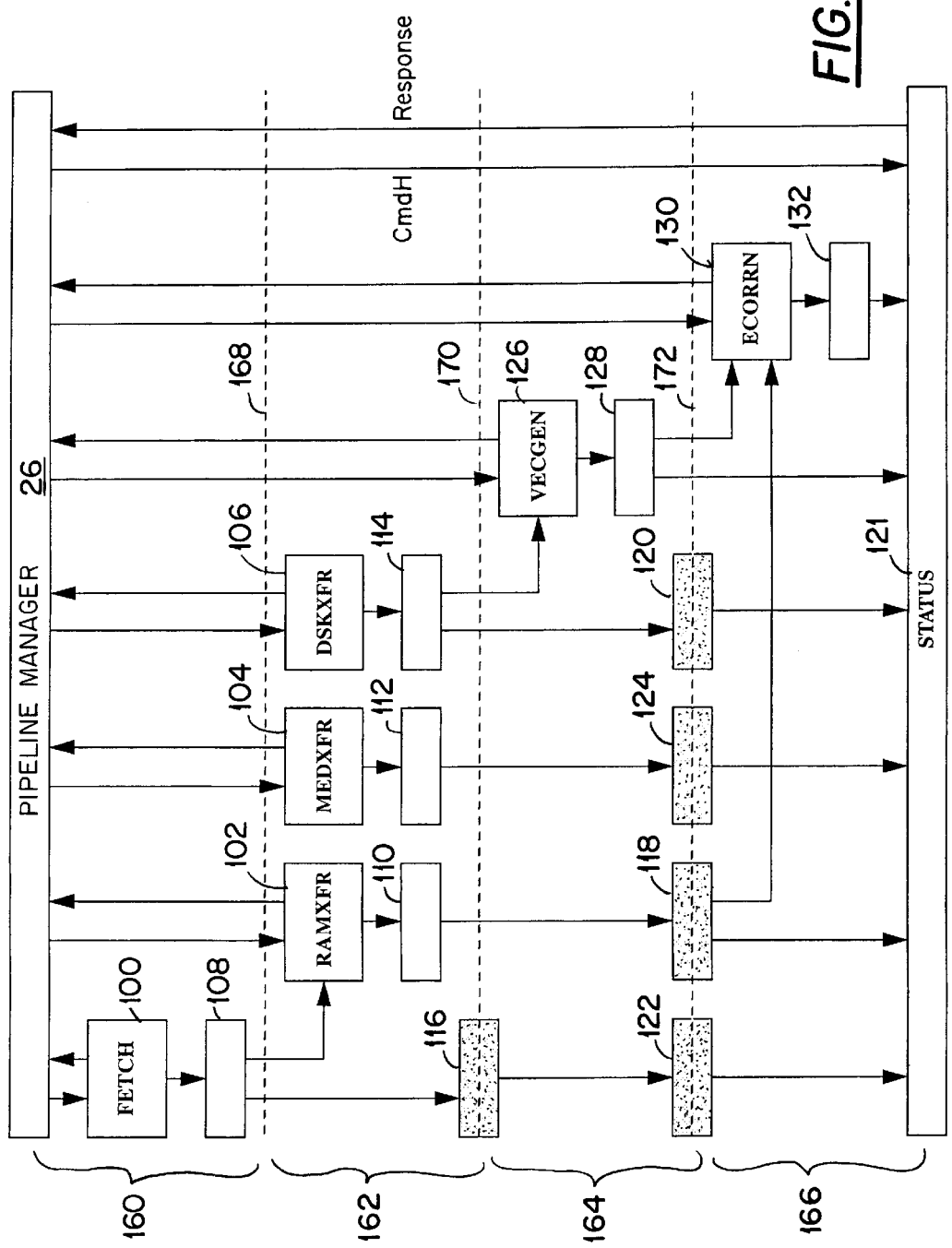
FIG. 14 illustrates a disk read operation pipeline.

FIG. 14 illustrates a read operation pipeline. A fetch process is performed per the control of pipeline manager 26 in an initial pipeline stage 160, which ends at an advance signal 168. A RAM transfer process 102, a media transfer process 104, and a disk transfer process 106 are each performed starting thereafter. Each of RAM transfer process 102 and disk transfer process 106 may be executed during either or both of the second and third pipeline stages 162 and 164. Media transfer process 104 is forced to complete by the end of the second pipeline stage 162.

Fetch process 100, which completes within the first pipeline stage 160, outputs its data to holding register 108. Portions of that data required for a RAM transfer are forwarded to RAM transfer process 102 at some time during the second and third pipeline stages 162 and 164. Status information from holding register 108 is forwarded to a second stage holding register 116 at advance signal 170, and again forwarded to a third stage holding register 122 at the next advance signal 172. The data held in the first stage holding register 110, which is output by RAM transfer process 102, is forwarded to a second stage holding register 118 at the advance signal 172. Data required for error correction process 130 is obtained from second stage holding register 118 during the fourth pipeline stage 166. Status data is forwarded from second stage holding register 118 to status process 121 which is executed at some time during the fourth pipeline stage 166.

The data output by media transfer process 104 is placed in initial stage holding register 112, and transferred to a second stage holding register 124 at the end of the third pipeline stage 164, which coincides with advance signal 172. That data is then forwarded to the status process 121, at some time during the fourth pipeline stage 166. Similarly, data in initial holding register 114 from disk transfer process 106 is forwarded to a second stage holding register 120, for holding until the point at which status process 121 can acquire that data at some time during the fourth pipeline stage 166. Vector generation process 126, when invoked some time during the third pipeline stage 164, obtains data from initial stage holding register 114, and outputs data into a holding register 128, a portion of Xwhich is used by a subsequent invocation of error correction process 130, and the rest of which is forwarded to status process 121 at some point during the fourth pipeline stage 166. Error correction process 130 is invoked in the fourth pipeline 166, and outputs data to a holding register 132, from which status data can be obtained by status process 121 at a subsequent time during the same fourth pipeline stage 166. As was the case for a write operation as shown in FIG. 13, one or more subsequent stage holding registers (e.g., holding registers 116 and 122 for a fetch loprocess 100) are provided to which data in a process' initial holding register is transferred at the time of an advance signal marking a new pipeline stage, in order to allow for the initial register to be used for a subsequent invocation of the same process.

Figure 15:
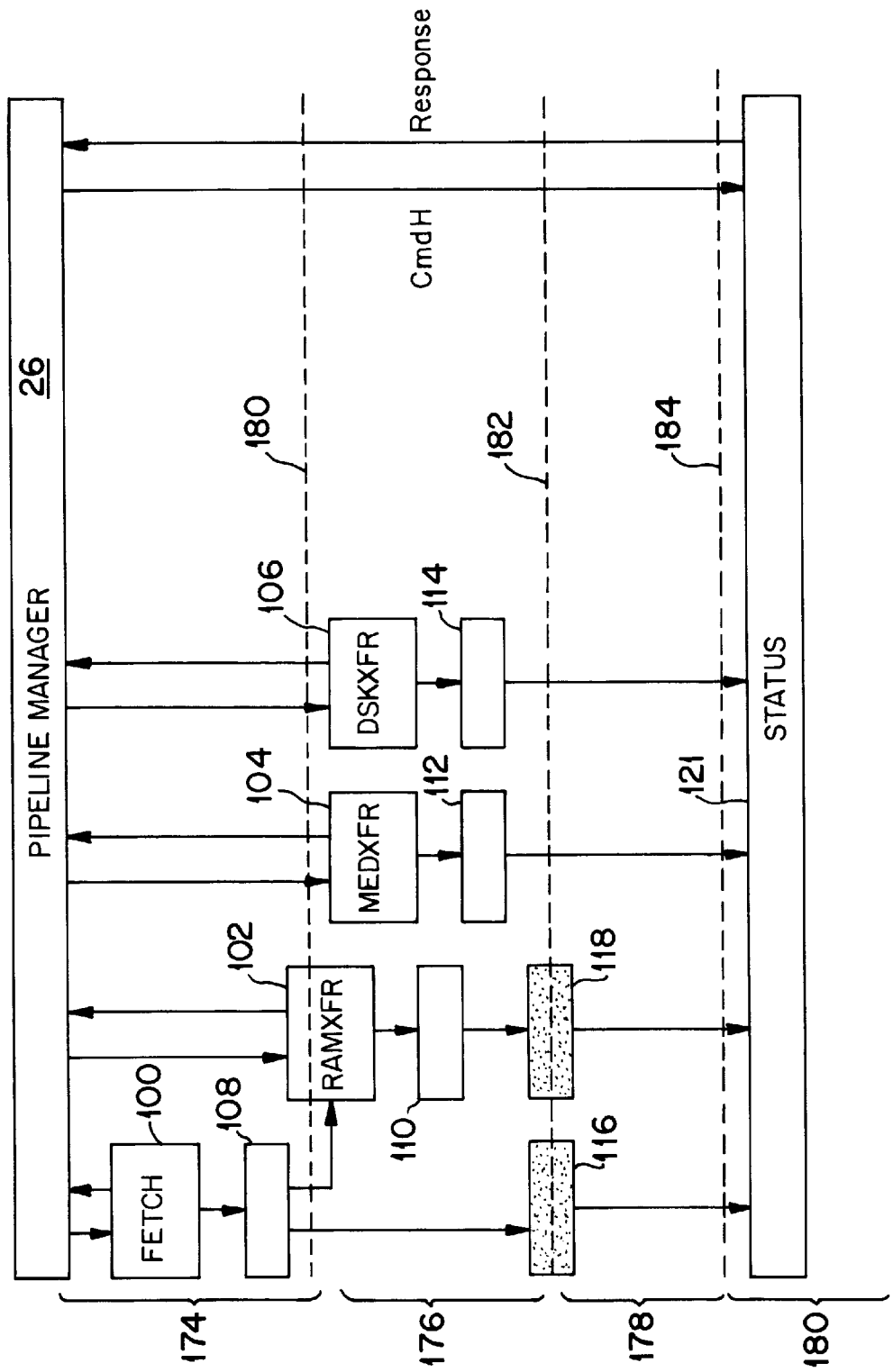
FIG. 15 illustrates a disk compare operation pipeline.

FIG. 15 shows a compare operation pipeline comprising first, second, third. and fourth pipeline stages 174, 176, 178 and 180. Fetch process 100 is executed at some time during first pipeline stage 174, and outputs data into an initial stage holding register 108. RAM transfer process 102 is invoked some time between the first and second pipeline stages 174 and 176, and by the end of second pipeline stage 176 outputs data into an initial stage holding register 110. Media transfer process 104 is invoked at some time during the second pipeline stage 176, and outputs data to a holding register 112. Disk transfer process 106 is invoked at some time extending between the second and third pipeline stages 176 and 178. The status process 121, is invoked during the fourth pipeline stage 180. Data from initial stage holding register 108 of fetch process 100 is forwarded to a second stage holding register 116 simultaneous with the advance signal 182 marking the beginning of third pipeline stage 178. Similarly, data in the initial stage holding register 110 of RAM transfer process 102 is forwarded to a second stage holding register 118 at the time of advance signal 182, which marks the beginning of third pipeline stage 178.

While the invention has been described by way of example embodiments, it is understood that the words which have been used herein are words of description, rather than words of limitation. Changes may be made, within the purview of the appended claims, without departing from the scope and spirit of the invention in its broader aspects. Although the invention has been described herein with reference to particular structure, materials and embodiments, it is understood that the invention is not limited to the particulars disclosed. The invention extends to all appropriate equivalent structures, uses and mechanisms.

What is claimed is:

1. In a non-volatile storage subsystem having a read channel coupling a disk controller to a disk head assembly, a read channel interfacing subsystem for interfacing said disk controller to said read channel, said read channel interfacing subsystem comprising:

a set of process units, a first subset of said process units being utilized when a disk read operation is carried out via said read channel, a second subset of said process units being utilized when a disk write operation is carried out via said read channel, and a third subset of said process units being utilized when a disk compare operation is carried out via said read channel, each said process unit comprising mechanisms for entering an idle state and for carrying out an operation state flow; and a pipeline manager which, for a given operation comprising one of said disk read, disk write, and disk compare operations, enables and disables each utilized process unit of said given operation, so each said utilized process unit of said given operation is done and ready to carry out its operation state flow for a subsequent operation and has poured into a holding register resulting data needed by another utilized process unit of said given operation, before the occurrence of a predetermined upcoming periodically recurring advance signal.

2. The non-volatile storage subsystem according to claim 1, wherein said set of process units comprises a fetch unit, a media transfer unit, a disk transfer unit, a RAM transfer unit, a vector generation unit, an error correction unit, and a status unit.

3. The non-volatile storage subsystem according to claim 1, wherein said first subset of said process units comprises said fetch unit, said media transfer unit, said disk transfer unit, said RAM transfer unit, said vector generation unit, said error correction unit, and said status unit.

4. The non-volatile storage subsystem according to claim 3, wherein said second subset of said process units comprises said fetch unit, said RAM transfer unit, said disk transfer unit, said media transfer unit, and said status unit.

5. The non-volatile storage subsystem according to claim 1, comprising an advance signal generator and a mechanism for facilitating multiple invocations of a given process unit within a common pipeline stage.

6. In a non-volatile storage subsystem having a read channel coupling a disk controller to a disk head assembly, a read channel interfacing subsystem for interfacing said disk controller to said read channel, said read channel interfacing system comprising:

a set of process units, a first subset of said process units being utilized when a disk read operation is carried out via said read channel, a second subset of said process units being utilized when a disk write operation is carried out via said read channel, and a third subset of said process units being utilized when a disk compare operation is carried out via said read channel, each said process unit comprising mechanisms for entering an idle state and for carrying out an operation state flow;

a pipeline manager, which, for a given operation comprising one of said disk read, disk write, and disk compare operations, enables and disables each utilized process unit of said given operation, so each said utilized process unit of said given operation is done and ready to carry out its operation state flow for a subsequent operation and has poured into a holding register resulting data needed by another utilized process unit of said given operation, before the occurrence of a predetermined upcoming periodically recurring advance signal;

wherein said set of process units comprises a fetch unit, a media transfer unit, a disk transfer unit, a RAM transfer unit, a vector generation unit, an error correction unit, and a status unit; and wherein said third subset of said process units comprises said fetch unit, said RAM transfer unit, said media transfer unit, said disk transfer unit, and said status unit.

7. In a non-volatile storage subsystem having a read channel coupling a disk controller to a disk head assembly, a read channel interfacing subsystem for interfacing said disk controller to said read channel, said read channel interfacing subsystem comprising:

a set of process units, a first subset of said process units being utilized when a disk read operation is carried out via said read channel, a second subset of said process units being utilized when a disk write operation is carried out via said read channel, and a third subset of said process units being utilized when a disk compare operation is carried out via said read channel, each said process unit comprising mechanisms for entering an idle state and for carrying out an operation state flow; and a pipeline manager, which, for a given operation comprising one of said disk read, disk write, and disk compare operations, enables and disables each utilized process unit of said given operation, so each said utilized process unit of said given operation is done and ready to carry out its operation state flow for a subsequent operation and has poured into a holding register resulting data needed by another utilized process unit of said given operation, before the occurrence of a predetermined upcoming periodically recurring advance signal;

wherein said set of process units comprises a fetch unit, a media transfer unit, a disk transfer unit, a RAM transfer unit, a vector generation unit, an error correction unit, and a status unit, wherein said first subset of said process units comprises said fetch unit, said media transfer unit, said disk transfer unit, said RAM transfer unit, said vector generation unit, said error correction unit and said status unit, and wherein said third subset of said process units comprises said fetch unit, said RAM transfer unit, said media transfer unit, said disk transfer unit, and said status unit.

* * * * *